United States Patent
Iwashita et al.

(10) Patent No.: US 8,792,022 B2
(45) Date of Patent: Jul. 29, 2014

(54) IMAGE PICKUP APPARATUS, IMAGE PICKUP SYSTEM, AND METHOD OF CONTROLLING THEM

(75) Inventors: Atsushi Iwashita, Honjo (JP); Toshio Kameshima, Kumagaya (JP); Tomoyuki Yagi, Honjo (JP); Katsuro Takenaka, Honjo (JP); Sho Sato, Kumagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 13/423,017

(22) Filed: Mar. 16, 2012

(65) Prior Publication Data

US 2012/0242871 A1    Sep. 27, 2012

(30) Foreign Application Priority Data

Mar. 24, 2011   (JP) ................................ 2011-065980

(51) Int. Cl.
*H04N 5/217* (2011.01)
*H04N 5/335* (2011.01)
(52) U.S. Cl.
USPC ........................... 348/241; 348/243; 348/294
(58) Field of Classification Search
USPC .............. 348/241, 243, 244, 248, 229.1, 362, 348/297
See application file for complete search history.

(56) References Cited

U.S. PATENT DOCUMENTS

| | | | |
|---|---|---|---|
| 2005/0084068 A1* | 4/2005 | Matsuno | 378/96 |
| 2008/0106627 A1* | 5/2008 | Ukai | 348/308 |
| 2008/0226031 A1 | 9/2008 | Yokoyama et al. | |
| 2009/0323897 A1* | 12/2009 | Kameshima et al. | 378/116 |

* cited by examiner

*Primary Examiner* — Michael Osinski
*Assistant Examiner* — Quan Pham
(74) *Attorney, Agent, or Firm* — Canon USA Inc. IP Division

(57) ABSTRACT

In an image pickup apparatus, a calculation unit calculates an amount of noise and an amount of afterimage that can be included in an electric signal or image data in an image pickup operation, based on output characteristic information indicating a manner in which the amount of noise and the amount of after image change as a function of an elapsed time since a voltage is applied to a detection unit, a temperature of the detection unit detected by a temperature detection unit, the voltage supplied to the conversion elements from a power supply unit, and an image pickup operation start time indicating a time elapsed since the supplying of the voltage to the detection unit is started until the image pickup operation is started to output the electric signal corresponding to an electric charge generated by the conversion element in the detection unit.

10 Claims, 13 Drawing Sheets

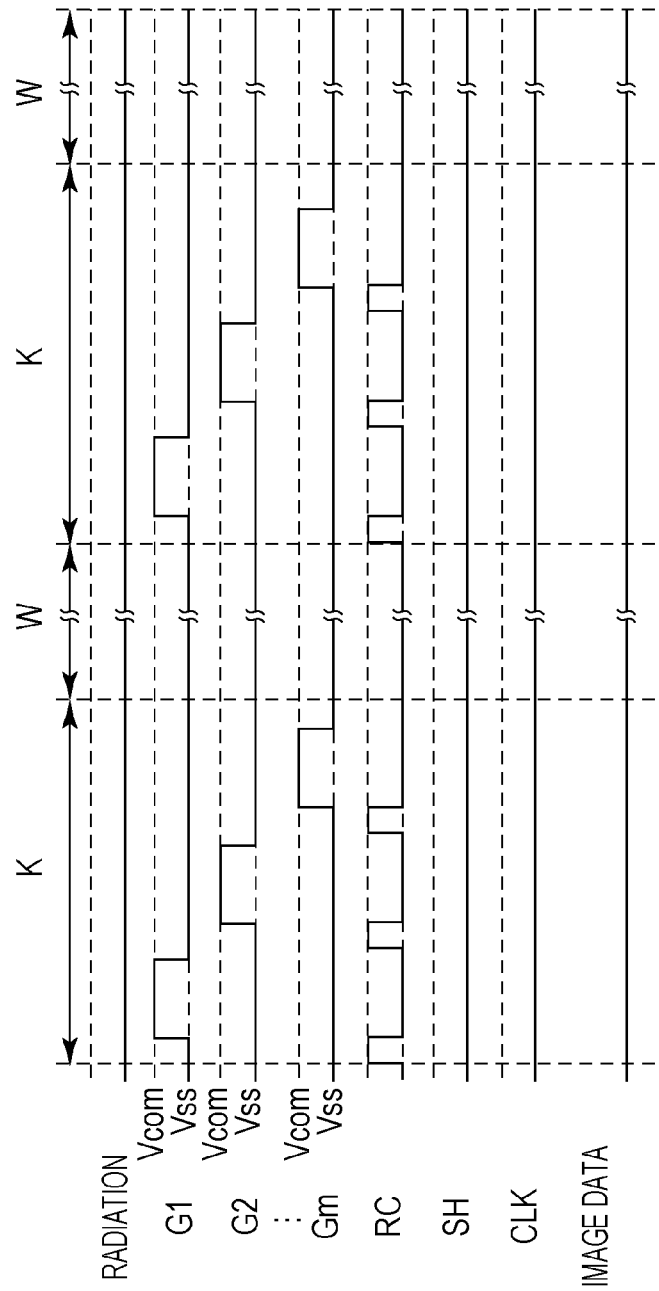

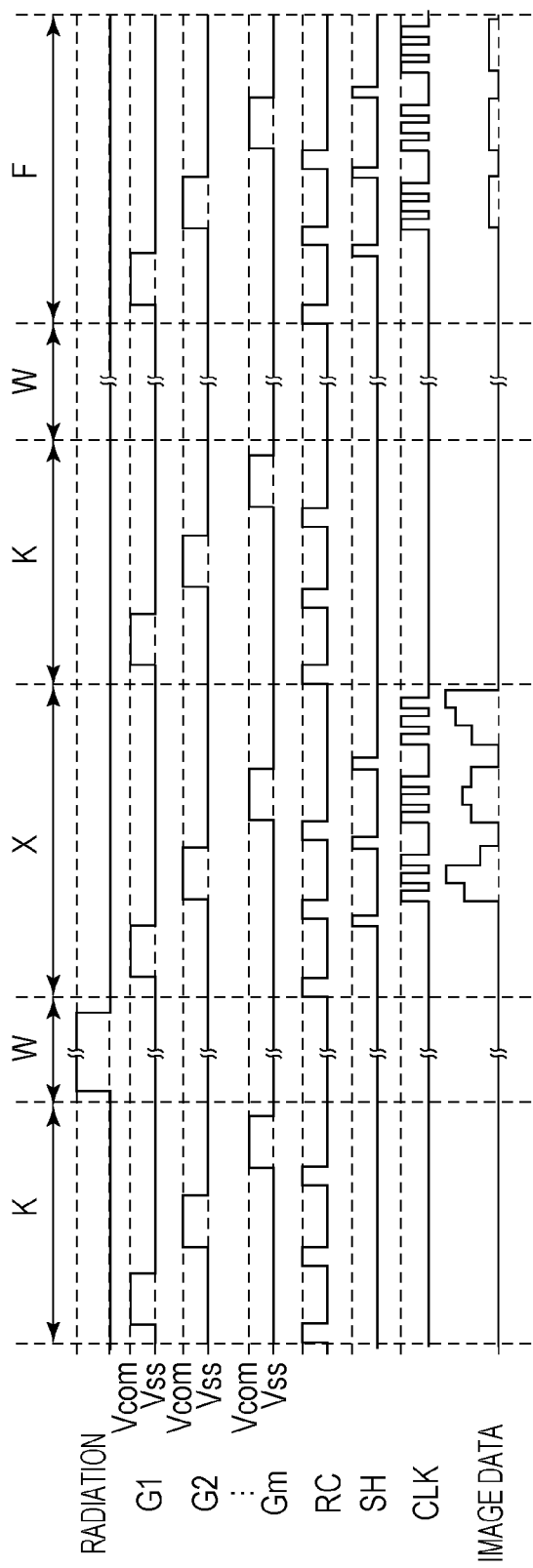

IMAGE PICKUP APPARATUS, IMAGE PICKUP SYSTEM, AND METHOD OF CONTROLLING THEM

BACKGROUND OF THE INVENTION

1. Field of the Invention

The present invention relates to an image pickup apparatus, an image pickup system, and a method of controlling the image pickup apparatus and the image pickup system. More particularly, the present invention relates to a radiation image pickup apparatus and a radiation image pickup system suitable for use in capturing a general still image or a moving image in fluoroscopy.

2. Description of the Related Art

In recent years, a radiation image pickup apparatus using a flat panel detector (hereinafter referred to as a detector) produced using a semiconductor material has been used in practical applications such as medical diagnosis, nondestructive inspection, or the like. One of such radiation image pickup apparatuses is a digital image pickup apparatus used to capture a general still image or a fluoroscopic moving image based on X-ray radiation, for use in medical diagnosis. As for the detector, it is known to use an indirect-conversion detector using a conversion element realized by combining a photoelectric conversion element using amorphous silicon and a wavelength conversion element for converting radiation into light of a wavelength detectable by the photoelectric conversion element. A direct-conversion detector is also known which uses a conversion element formed using amorphous selenium or a similar material capable of directly converting radiation into an electric charge.

In image pickup apparatuses of the types described above, the amorphous semiconductor forming the conversion element may include dangling bonds or defects functioning as trap levels. Such dangling bonds or defect may cause a change in dark current. When there are dangling bonds, illumination of radiation or light performed in the past may cause an afterimage (lag) to be generated and the dangling bond may cause a change of the afterimage to occur. As a result, a change can occur in the image signal acquired by the image pickup apparatus. U.S. Patent Application Publication No. 2008/0226031 discloses a technique to, before exposing a detector to radiation or light bearing object information, expose the detector with light bearing no object information emitted from a dedicated light source to thereby suppress a change in characteristic of the image pickup apparatus or a change in an acquired image signal.

However, the method disclosed in U.S. Patent Application Publication No. 2008/0226031 requires the provision of a dedicated light source and a driving unit for driving the light source in the apparatus results in an increase in the size and weight of the image pickup apparatus, and which makes it difficult to realize an image pickup apparatus with a small size and a small weight. Furthermore, to expose the detector to light emitted from the light source, additional electric power is necessary to operate the light source, which results in an increase in the total electric power consumed by the image pickup apparatus or the system. Thus, use of the light source is undesirable. However, if the light source is not used, it is not ensured, depending on the circumstance in which the image pickup apparatus is operated, that no change occurs in the image signal acquired by the image pickup apparatus during the image pickup operation, and it is difficult to estimate the amount of change if the change occurs. Therefore, it is difficult for the image pickup apparatus or the image pickup system to acquire information as to whether the image pickup apparatus needs some operation to handle the problem or information as to whether an image pickup operation by an operator is to be allowed. If there is no change, no problem occurs. However, if a change occurs, the change may make it difficult to obtain a good image signal.

SUMMARY OF THE INVENTION

In view of the above-described problems, an embodiment of the present invention provides an image pickup apparatus and an image pickup apparatus system capable of determining whether a change will occur in an image signal and calculating the predicted magnitude of the change if the change occurs.

According to an aspect of the present invention, there is provided an image pickup apparatus including a detection unit including a plurality of conversion elements each configured to convert radiation or light into an electric charge, a driving circuit configured to drive the detection unit to output an electric signal corresponding to the electric charge from the detection unit, a reading circuit configured to output the electric signal as image data, whereby the detector performs an image pickup operation to output the electric signal, a power supply unit configured to supply voltage to the conversion elements, a temperature detection unit configured to detect a temperature of the detection unit, and a calculation unit configured to calculate an amount of noise and an amount of afterimage that can be included in the electric signal or the image data in the image pickup operation, based on output characteristic information indicating a characteristic in terms of changes in amount of noise and amount of afterimage that can be included in the electric signal or the image data as a function of elapsed time since the supplying of the voltage is started, the temperature, the voltage, and an image pickup operation start time defined by a time elapsed since the start of the supplying the voltage to the detection unit till the start of the image pickup operation.

According to an aspect of the present invention, there is provided an image pickup system including the image pickup apparatus described above and a control computer that transmits a control signal to the control unit.

Thus, the image pickup apparatus/system according to the embodiment of the invention is capable of predicting the amount of noise and the amount of afterimage that will occur in the image signal to be obtained in the image pickup operation. That is, the image pickup apparatus/system is capable of determining whether a change will occur in image signal to be obtained, and capable of calculating the magnitude of the change if the change occurs. In a case where an occurrence of a change is predicted and the predicted amount of noise or the predicted amount of afterimage is not within a predetermined allowable range, it is possible to change the operation of the image pickup apparatus or the value of the voltage applied to the conversion element based on the calculated amount of noise and the amount of afterimage. This makes it possible to control the image pickup operation start time such that the change in the image signal falls in the predetermined allowable range. Based on the calculated characteristic, it is possible to provide information about the change in the image signal to an operator or it is possible to disable some operations of the image pickup apparatus depending on the calculation result. Thus, it becomes possible to realize a small-sized, light-weight, and low-power image pickup apparatus capable of capturing an image in a state in which an uncontrolled change in the image signal is suppressed without having to use a light source.

Further features of the present invention will become apparent from the following description of exemplary embodiments with reference to the attached drawings.

BRIEF DESCRIPTION OF THE DRAWINGS

FIGS. 5A to 5C are timing charts associated with an image pickup apparatus according to the first embodiment of the present invention.

DESCRIPTION OF THE EMBODIMENTS

The present invention is described in detail below with reference to embodiments in conjunction with the accompanying drawings. In the present description, the term "radiation" is used to describe a wide variety of radiant rays including various beams of particles (note that a photon is one of such particles) emitted via radioactive decay such as an alpha beam, a beta beam, and a gamma ray, and other beams with high energy similar to that of such particle beams. For example, an X-ray, a cosmic ray, etc., fall in the scope of radiations.

First Embodiment

Figure 4A:
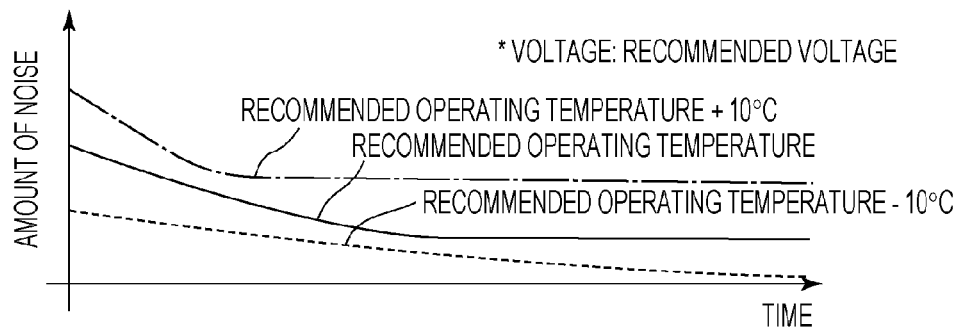
FIGS. 4A and 4B are characteristic diagrams illustrating time dependence of noise of a conversion element according to the first embodiment of the present invention.
Figure 4B:
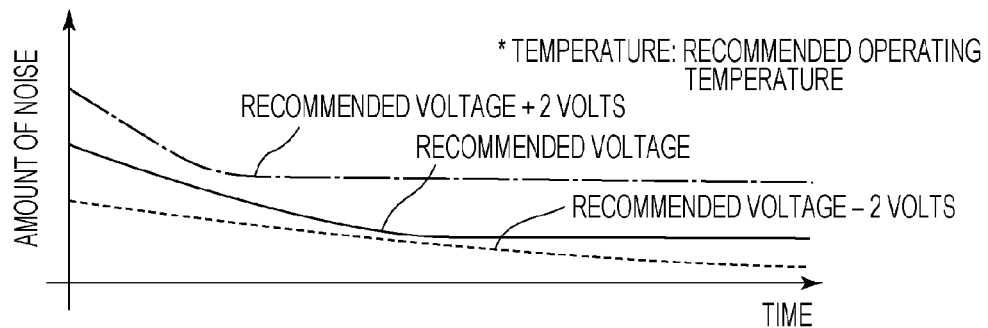
Figure 4C:
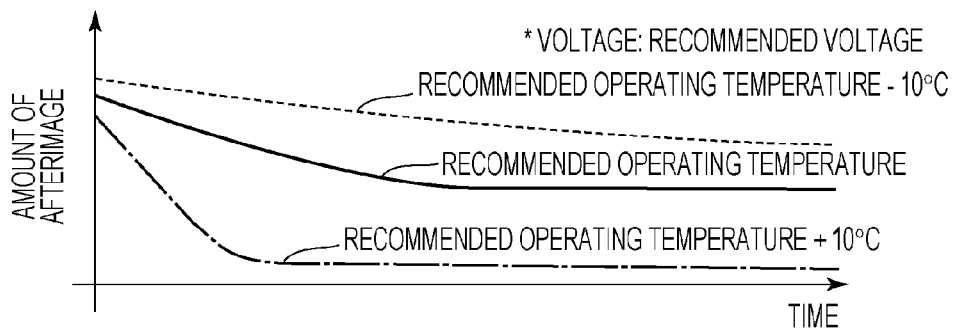
FIGS. 4C and 4D are characteristic diagrams illustrating time dependence of afterimage of the conversion element.
Figure 4D:
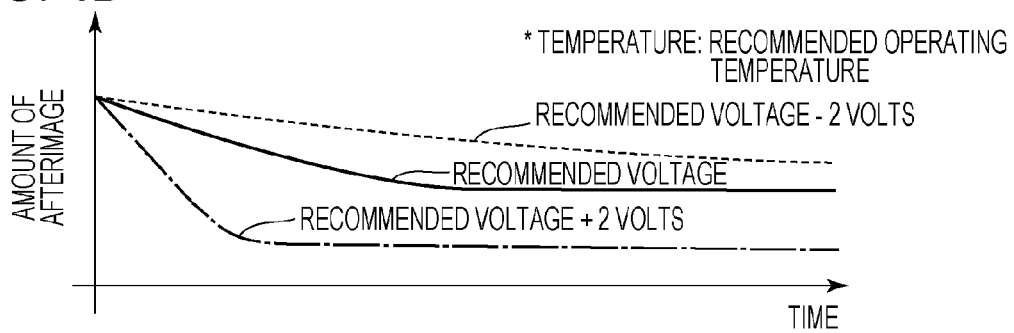

To explain the concept of the present invention, time dependence of amount of noise of the conversion element according to a first embodiment of the present invention is described below with reference to FIGS. 4A and 4B, and time dependence of amount of afterimage is described with reference to FIGS. 4C and 4D. In FIGS. 4A and 4B, each horizontal axis indicates an elapsed time since the start of supplying a voltage to the conversion element. Note that the supplying of the voltage starts at a point at which the vertical axis intersects the horizontal axis in each of FIGS. 4A to 4D. In FIGS. 4A to 4D, a recommended voltage is a recommended value of the voltage supplied to the conversion element, and recommended operating temperature is a recommended value of temperature of the conversion element during the image pickup operation.

An amount of noise and an amount of afterimage are indices indicating the quality of an electric signal output from a detection unit including a plurality of conversion elements and image data output from a detector including a detection unit. Noise is a random fluctuation component included together with intrinsic information in a signal. The noise of the conversion element mainly originates from kTC noise, dark current, etc. An afterimage occurs as a result of an influence of an electric signal based on irradiation of radiation or light in a previous image pickup operation on an electric signal or image data output in a following image pickup operation. In the case of the PIN-type photodiode used as the conversion element in the present embodiment, main factors that cause the afterimage are an electric signal remaining without being completely output because of a large time constant associated with the switch element, kTC noise or partition noise generated when the signal is output by the switch element, etc.

Investigation performed by the present inventors has revealed that the noise and the afterimage change with elapsed time since a voltage is supplied to the conversion element, and the change in characteristic depends on the voltage applied to the conversion element and the temperature of the conversion element. The voltage applied to the conversion element refers to a potential difference between two electrodes of the conversion element. In the case of the PIN-type photodiode, the voltage is reversely applied thereto.

As shown in FIGS. 4A and 4B, noise appears immediately after the voltage is applied to the conversion element. The magnitude thereof is the greatest immediately after the voltage is applied to the conversion element, and the magnitude of the noise decreases with elapsed time and finally converges to a particular value. As shown in FIGS. 4A and 4B, as the temperature of the conversion element increases and as the voltage applied to the conversion element increases, the amount of noise increases and the time needed for the noise to converge to the particular value decreases.

As for afterimages, as shown in FIGS. 4C and 4D, an afterimage appears immediately after the voltage is applied to the conversion element, and the amount thereof is the greatest immediately after the voltage is applied to the conversion element. The amount of the afterimage decreases with elapsed time and finally converges to a particular value. As shown in FIGS. 4C and 4D, as the temperature of the conversion element increases or as the voltage applied to the conversion element increases, the amount of afterimage decreases and the time for the amount of afterimage to converge to the particular value decreases.

In view of the above, the present inventors have established a method of calculating, based on the above-described feature of the change in characteristics, the predicted amount of noise and the predicted amount of afterimage included in the electric signal output from the detection unit or in the image data output from the detector in the image pickup operation. That is, by performing the calculation, it is possible to predict in advance the amount of noise and the amount of afterimage included in the electric signal or the image data output in the image pickup operation. More specifically, the output characteristic information is determined in advance which indicates the change in the amount of noise and the change in the amount of afterimage as a function of various parameters including the elapsed time since the application of the voltage to the conversion element, the temperature of the detection unit including the conversion element, and the voltage applied to the conversion element. The output characteristic information may be determined based on the image data obtained for various values of the parameters in the test operation performed on the image pickup apparatus before the shipment or the installation of the apparatus, and the output characteristic information may be stored in a table or may be expressed by an approximating formula. The predicted amounts of noise and afterimage that will be included in the electric signal output from the detection unit or in the image data output from the detector in the image pickup operation are calculated using the output characteristic information, the temperature of the detection unit, the voltage supplied from the power supply unit to the conversion element, and the image pickup operation start time. The image pickup operation start time is defined by a time elapsed since the supplying of the voltage to the detection unit is started until the image pickup operation is started. By calculating the predicted amount of noise and the predicted amount of afterimage that will be included in the electric signal or the image data in the image pickup operation, it becomes possible to change the operation of the image pickup apparatus or the value of the voltage supplied to the conversion elements depending on the calculation result. This makes it possible to control the image pickup operation start time such that the change in the image signal falls in the predetermined allowable range. Furthermore, based on the calculated characteristics, it is possible to provide information about the change in the image signal to the operator or it is possible to disable some operations of the image pickup apparatus depending on the calculation result. Thus, using the small-size, small-weight, and low-power image pickup apparatus, it is possible to perform the image pickup operation in a state in which an uncontrolled change in the image signal acquired in the image pickup operation is suppressed without having to use a light source. The details of the image pickup operation and the preparatory operation for image pickup operation will be described later. The temperature of the detection unit may be a temperature of each conversion element measured for each conversion element or may be the average thereof. The temperature may be measured using a known temperature sensor in a state in which the temperature sensor is or is not in direct contact with the conversion element.

Figure 1:
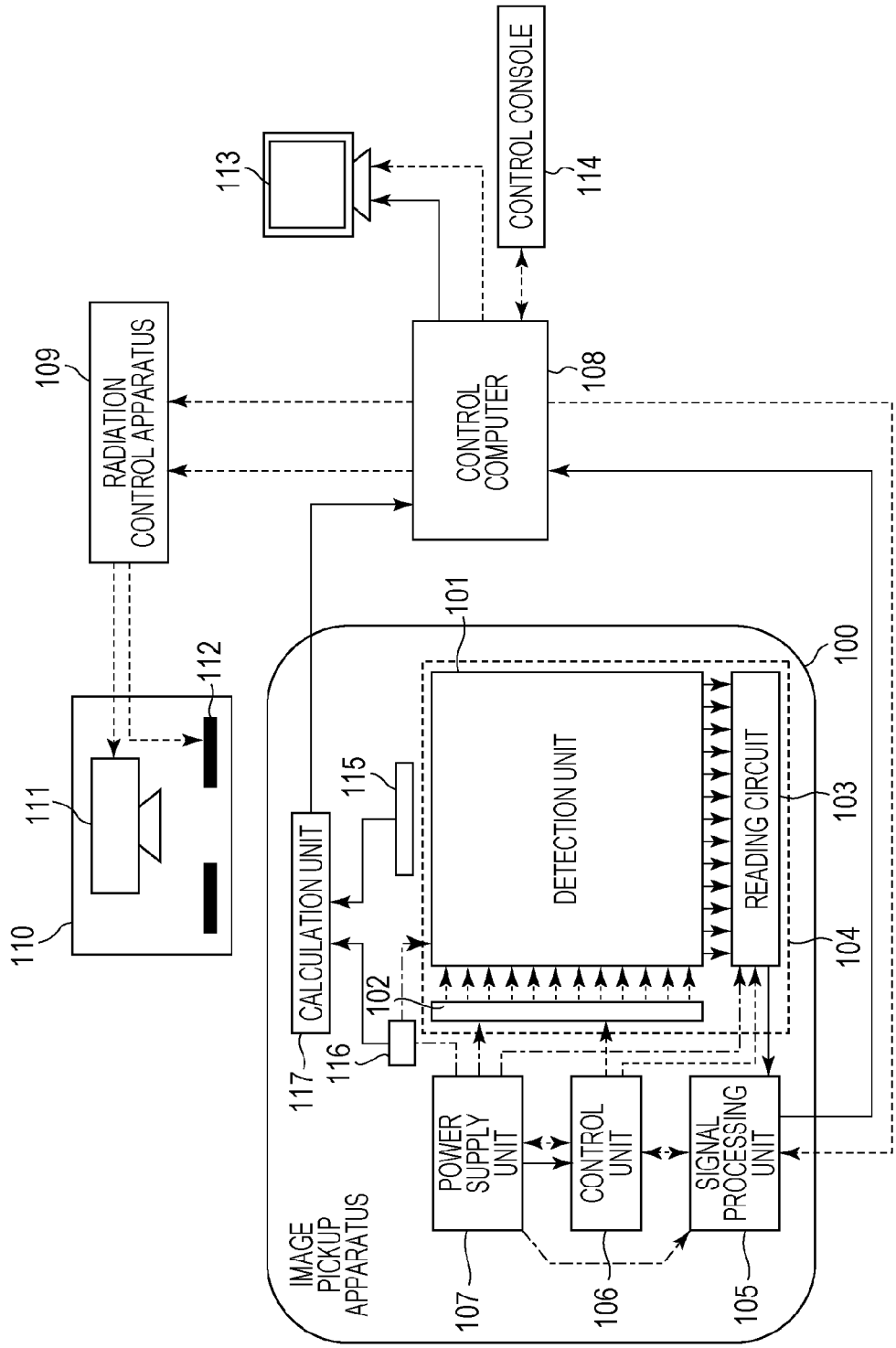
FIG. 1 is a block diagram schematically illustrating an image pickup system according to an embodiment of the present invention.

As shown in FIG. 1, the radiation image pickup system according to the present embodiment includes an image pickup apparatus 100, a control computer 108, a radiation control apparatus 109, a radiation generating apparatus 110, a display apparatus 113, and a control console 114. The image pickup apparatus 100 includes flat panel detector 104 including a detection unit 101 including a plurality of pixels each configured to convert radiation or light into an electric signal, a driving circuit 102 that drives the detection unit 101, and a reading circuit 103 that reads the electric signal from the driven detection unit 101 and outputs the electric signal as image data. Note that each pixel includes at least a conversion element. The image pickup apparatus 100 further includes a signal processing unit 105 that processes the image data supplied from the flat panel detector (hereinafter, referred to simply as the detector) 104 and outputs the resultant image data, a control unit 106 that controls the operation of the detector 104 by supplying control signals to various elements, and a power supply unit 107 that supplies bias voltages to various elements. The signal processing unit 105 receives a control signal from a control computer 108 (described below) and supplies the control signal to the control unit 106. According to the control signal received from the control computer 108, the control unit 106 controls at least one of the driving circuit 102, the reading circuit 103, the signal processing unit 105, and the power supply unit 107. The power supply unit 107 includes power supply circuit such as a regulator that receives a voltage from an external power supply or an internal battery (not shown) and supplies necessary voltages to the detection unit 101, the driving circuit 102, and the reading circuit 103.

The control computer 108 transmits control signals to the radiation generating apparatus 110 and the image pickup apparatus 100 to synchronize them or determine the state of the image pickup apparatus 100, and performs image processing on the image data output from the image pickup apparatus 100 to perform a correction, storing, and displaying. The control computer 108 also transmits a control signal to the radiation control apparatus 109 to determine a radiation exposure condition based on the information supplied from the control console 114. The control console 114 is used by an operator to input an image pickup condition such as a time at which the image pickup operation is to be started. According to the information given via the control console 114, the control computer 108 acquires the image pickup operation start time defined by the time elapsed since the start of the supplying of the voltage from the power supply unit 107 to the detection unit 101 until the start of the image pickup operation. Based on the acquired image pickup operation start time, the control computer 108 supplies a control signal to the control unit 106 and transmits the information indicating the image pickup operation start time to a calculation unit 117 (described below).

According to the control signal received from the control computer 108, the radiation control apparatus 109 controls the operation of emitting radiation from a radiation source 111 disposed in the radiation generating apparatus 110 and controls the operation of an exposure field limiting mechanism 112. The exposure field limiting mechanism 112 has a function of changing the exposure field size which is an area, irradiated with radiation or light corresponding to radiation, of the detection unit 101 of the detector 104. When parameters in terms of object information, image pickup conditions, etc., used by the control computer 108 in its control operation are input via the control console 114, the input parameters are transmitted to the control computer 108. The display apparatus 113 displays an image according to the image data processed by the control computer 108.

The radiation image pickup system according to the present embodiment further includes a temperature detection unit 115, a voltage detection unit 116, and a calculation unit 117. The temperature detection unit 115 detects the temperature of the detection unit 101 or the conversion element. The temperature detection unit 115 includes a temperature sensor such as a resistance-temperature detector, a thermocouple, a thermistor, or the like. The temperature detection unit 115 may detect the temperature of a particular one of the conversion elements in the detection unit 101 or may detect the temperature of each of the conversion elements in the detection unit 101. The temperature may be measured for a particular number of conversion elements in the detection unit 101, and the average thereof may be employed as the temperature of the detection unit 101. The voltage detection unit 116 detects the voltage supplied from the power supply unit 107 to the conversion element of the detection unit 101. The voltage detection unit 116 is disposed, for example, between the power supply unit 107 and the detection unit 101. A voltmeter configured using a known technique to monitor the voltage supplied from the power supply unit 107 to the conversion element is used as the voltage detection unit 116. The voltage detection unit 116 may further include a memory for storing information indicating a timing of starting supplying the voltage and information associated with a recommended image pickup operation start time, and may also include a unit for detecting the image pickup operation start time based on the stored information indicating the timing of starting the supplying of the voltage and the information supplied from the control console 114. The calculation unit 117 calculates the amount of noise and the amount of afterimage included in the electric signal output from the detection unit 101 in the image pickup operation. To calculate the amount of noise and the amount of afterimage included in the electric signal output from the detection unit 101, the calculation unit 117 may calculate the amount of noise and the amount of afterimage that can be included in the electric signal output from the detection unit 101 in the image pickup operation. Alternatively, the calculation unit 117 may calculate the amount of noise and the amount of afterimage that can be included in the image data output from the reading circuit 103, or the amount of noise and the amount of afterimage that can be included in the image data output from the signal processing unit 105. The calculation unit 117 has output characteristic information. Based on the output characteristic information, the temperature of the detection unit 101, the voltage supplied from the power supply unit 107 to the detection unit 101, and the image pickup operation start time, the calculation unit 117 calculates the amount of noise and the amount of afterimage that can be included in the electric signal output from the detection unit 101 in the image pickup operation. Based on the characteristic calculated by the calculation unit 117, the control computer 108 supplies a control signal to the control unit 106 to change the voltage supplied to the conversion element of the detection unit 101 before or during the image pickup operation or to change the operation of the detector. This function of the control computer 108 may be implemented in the control unit 106 or the calculation unit 117. Still alternatively, without using the voltage detection unit 116, the amount of noise and the amount of afterimage may be calculated by the calculation unit 117 based on the voltage set by the control computer 108. In the present embodiment, it is assumed by way of example but not limitation that the amount of noise and the amount of afterimage that can be included in the output during the image pickup operation are calculated by the calculation unit 117 based on the prestored output characteristic information, the temperature of the detection unit 101, the voltage supplied to the detection unit 101, and the image pickup operation start time. The calculation may be performed by the control computer 108 or the control unit 106 in the above-described manner. The change in the amount of noise and the change in the amount of afterimage depend on whether a preparatory operation for image pickup operation is performed before the image pickup operation and on how the preparatory operation for image pickup operation is performed. However, in any case, the tendency of the change is similar to that shown in FIGS. 4A to 4D. The output characteristic information may be acquired in advance by measuring the change in the amount of noise and the change in the amount of afterimage taking into account the effects of the preparatory operation for image pickup operation. More specifically, for example, in a case where the preparatory operation for image pickup operation is performed a plurality of times, output characteristic information is acquired for each preparatory operation for image pickup operation. On the other hand, in a case where no preparatory operation for image pickup operation is performed, output characteristic information is acquired for a sequence of operations including no preparatory operation for image pickup operation. The output characteristic information may be acquired such that image data is obtained from the image pickup apparatus for various values of parameters before the image pickup apparatus is shipped or installed, and the obtained image data is stored in the form of a table or is expressed by an approximating formula.

It is effective to use the calculated amount of noise and amount of afterimage in the functions described below of the control computer 108. First, the calculated amount of noise and amount of afterimage may be displayed on the display apparatus 113 thereby to notify the operator of the amount of noise and amount of afterimage. For example, when the calculated amount of noise or the amount of afterimage is not within an allowable range for the image data for medical diagnosis, a warning may be given to the operator. Secondary, based on the calculated amount of noise or the amount of afterimage, the operation of the image pickup apparatus or the image pickup system may be changed. For example, when the calculated amount of noise or the amount of afterimage is not within a predetermined allowable range, it is effective to disable the start of the image pickup operation and delay the image pickup operation start time such that the amount of noise and the amount of afterimage fall within the predetermined allowable ranges. Thirdly, the operation of the image pickup apparatus may be changed such that the calculated amount of noise and the calculated amount of afterimage are within predetermined allowable ranges. For example, it is effective to reduce the time period of the accumulation operation in the image pickup operation. It is also effective to increase the voltage supplied to the conversion element before the image pickup operation thereby to reduce the waiting time before the image pickup operation is allowed. By changing the operation of the image pickup apparatus or by changing the voltage supplied to the conversion element based on the calculated amount of noise and the amount of afterimage, it is possible to control the image pickup operation start time such that the amount of noise and the amount of afterimage, which can be included in the electric signal or the image data, fall within the allowable ranges. Thus, using the small-size, small-weight, and low-power image pickup apparatus, it is possible to perform the image pickup operation in a state in which an uncontrolled change in the image signal acquired in the image pickup operation is suppressed without having to use a light source. The required image pickup operation start time may be determined by measuring, using a timer or the like, the elapsed time that leads the amount of noise and the amount of afterimage included in the image data to fall within the predetermined allowable ranges. Alternatively, the required image pickup operation start time may be determined based on the control signal given to perform the operation of obtaining the image data.

Figure 2:
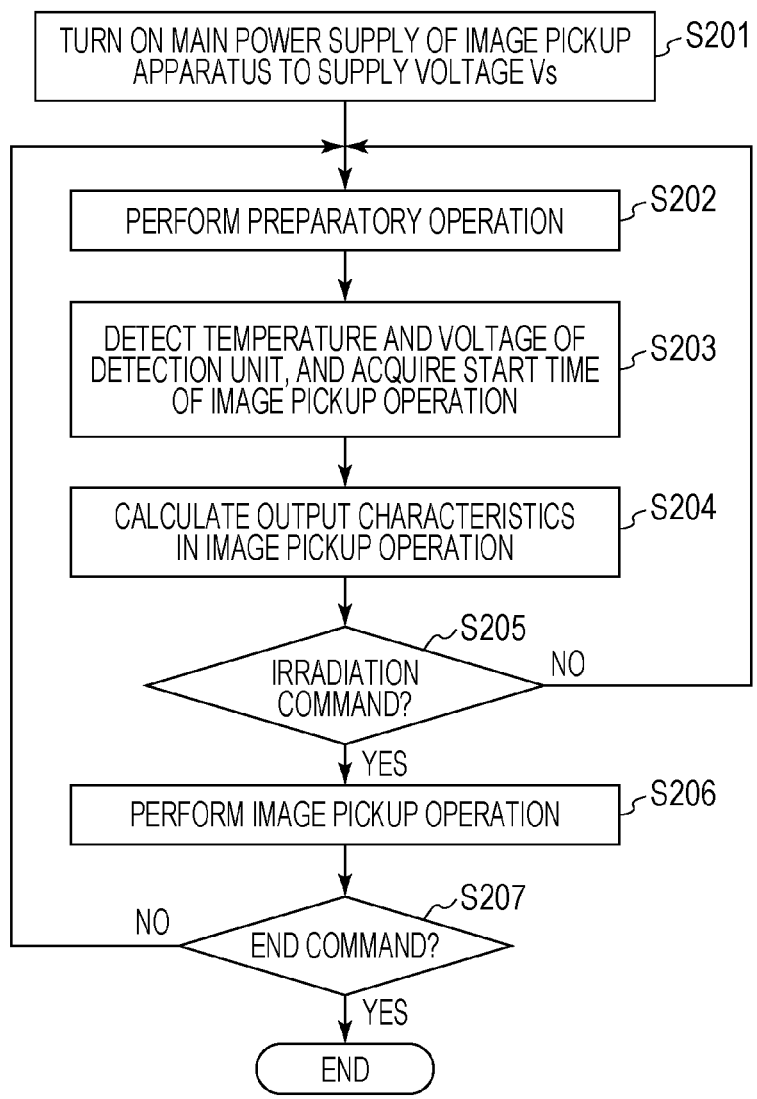
FIG. 2 is a flow chart illustrating an operation performed by an image pickup system according to a first embodiment of the present invention.

Next, referring to FIG. 2, an operation flow of the image pickup system according to the present embodiment is described below. If a main power supply of the image pickup system is turned on in step S201, then, under the control of the control computer 108, the control unit 106 controls the power supply unit 107 to supply a voltage Vs to the detection unit 101. Next, in step S202, the control unit 106 controls the detector 104 to perform a preparatory operation for image pickup operation. Thereafter, in step S203, the control unit 106 controls the temperature detection unit 115 to detect the temperature of the detection unit 101. Furthermore, the control unit 106 controls the voltage detection unit 116 to detect the value of the voltage Vs supplied to the detection unit 101. Information indicating the detected temperature, information indicating the detected voltage, and information indicating the image pickup operation start time are transmitted to the calculation unit 117 from the temperature detection unit 115, the voltage detection unit 116, and the control computer 108, respectively. Next, in step S204, based on the acquired information associated with the temperature, the voltage, and the image pickup operation start time, and based on the prestored output characteristic information, the calculation unit 117 calculates the amount of noise and amount of afterimage that can be included in the image signal or the image data. For example, in terms of calculation, the calculation unit 117 may be programmed to refer to characteristic information, such as that illustrated in FIGS. 4A to 4D, and use that information to calculate (determine) the amount of noise and/or amount of after image. To that end, the calculation unit 117 may make use of one or more of Equations (1) to (3) discussed below. Note that in the example described above, it is assumed that the information associated with the image pickup operation start time is sent from the control computer 108 to the calculation unit 117. However, the information may be given from another unit.

In step S205, it is determined whether a radiation exposure command is issued. If the answer to step S205 is NO, the control unit 106 controls the detector 104 to further continue the preparatory operation for image pickup operation. However, if the answer to step S205 is YES, then the process proceeds to step S206. In step S206, the control unit 106 controls the detector 104 to perform the image pickup operation. If the image pickup operation is complete and an END command is issued in step S207, then the control unit 106 controls various units to end the sequence of the operation. If the END command is not issued, the control unit 106 controls the detector 104 to again perform the preparatory operation for image pickup operation. In this case, at least one of parameters including the temperature, the voltage, and the image pickup operation start time may be reacquired, and the calculation unit 117 may recalculate the output characteristic of the image pickup operation.

Figure 3:
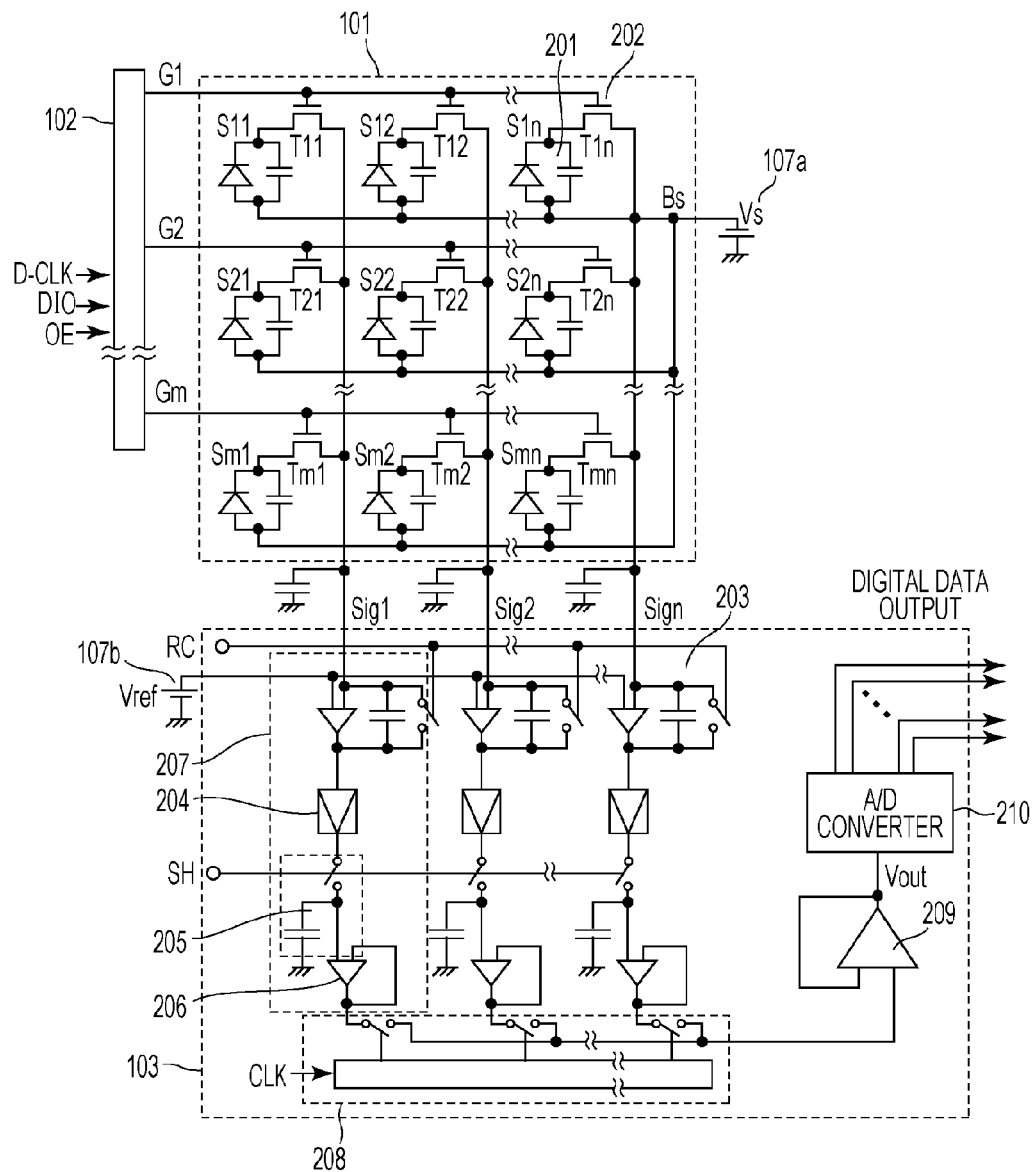
FIG. 3 is a simplified equivalent circuit diagram of an image pickup apparatus according to the first embodiment of the present invention.

Next, referring to FIG. 3, the image pickup apparatus according to the first embodiment of the present invention is described below. In FIG. 3, similar elements to those shown in FIG. 1 are denoted by similar reference symbols or numerals, and a further detailed description thereof is omitted. The image pickup apparatus has a detector including pixels arranged in an array with m rows and n columns, where m and n are integers equal to or greater than 2. In practical image pickup apparatuses, the detector includes a large number of pixels although FIG. 3 shows only 3 rows and 3 columns for simplicity of illustration. For example, in the case of a 17-inch image pickup apparatus, the detector typically includes pixels in an array with 2800 rows and 2800 columns.

A detection unit 101 includes a plurality of pixels arranged in an array including rows and columns. Each pixel includes a conversion element 201 that convers radiation or light into an electric charge and a switch element 202 that outputs an electric signal corresponding to the electric charge. In the present embodiment, by way of example, a PIN-type photodiode formed using amorphous silicon as a main material on an insulating substrate such as a glass substrate is employed as the photoelectric conversion element for converting light incident on the conversion element into the electric charge. Note that the characteristics shown in FIGS. 4A to 4D are of a photodiode typified by a PIN-type photodiode. As for the conversion element, an indirection-conversion element may be used which includes a wavelength conversion element disposed on a radiation-incident side of the photoelectric conversion element described above such that the wavelength conversion element converts the incident radiation into light with a wavelength in a range that can be sensed by the photoelectric conversion element, or a direct-conversion element capable of directly converting radiation into an electric charge may be used. As for the switch element 202, a transistor having a control terminal and two main terminals may be used. In the present embodiment, by way of example, a thin film transistor (TFT) is employed as the switch element 202. One electrode of the conversion element 201 is electrically connected to one of the two main terminals of the switch element 202, and the other electrode of the conversion element 201 is electrically connected to a power supply 107a via a common bias supply line Bs. A plurality of switch elements arranged in a particular row are electrically connected such that the control terminal of each switch element is electrically connected in common to a driving line in the particular row. For example, switch elements T11 to T1n in the first row are electrically connected such that the control terminal of each of these switch elements is connected in common to a driving line G1 in the first row. Via such driving lines, a driving signal for controlling turning-on/off of the switch elements is applied from a driving circuit 102 to the switch elements on a row-by-row basis. By controlling the turning-on/off of the switch elements 202 on the row-by-row basis, the driving circuit 102 scans the pixels on a row-by-row basis. A plurality of switch elements arranged in a column direction are electrically connected such that the other main terminal of each of these switch elements is connected to a signal line in a corresponding column, and more particularly, for example, the other main terminal of each of the switch elements T11 to Tm1 in a first column is electrically connected to a signal line Sig1 disposed in the first column, whereby electric signals corresponding to electric charges of conversion elements are output to the reading circuit 103 via signal lines when the switch elements are in the on-state. That is, a plurality of signal lines Sig1 to Sign extending in the column direction transmit the electric signals output from the pixels in parallel to the reading circuit 103.

The reading circuit 103 includes amplifiers 207 disposed for the respective signal lines thereby to amplify the electric signals output in parallel from the detection unit 101. Each amplifier 207 includes an integrating amplifier 203 that amplifies the electric signal input thereto, a variable gain amplifier 204 that amplifies an electric signal output from the integrating amplifier 203, a sample-and-hold circuit 205 that samples and holds the amplified electric signal, and a buffer amplifier 206. The integrating amplifier 203 includes an operational amplifier that amplifies the read electric signal and outputs the resultant amplified electric signal, an integrating capacitor, and a reset switch. The integrating amplifier 203 has a gain that can be changed by changing the capacitance of the integrating capacitor. An inverting input terminal of the operational amplifier is applied with the output electric signal, a non-inverting input terminal thereof is applied with a reference voltage Vref supplied by a reference power supply 107b, and the amplified electric signal is output from an output terminal thereof. The integrating capacitor is disposed between the inverting input terminal and the output terminal of the operational amplifier. The sample-and-hold circuits 205 are disposed such that one sample-and-hold circuit 205 is provided for each amplifier. Each sample-and-hold circuit 205 includes a sampling switch and a sampling capacitor. The reading circuit 103 includes a multiplexer 208 and a buffer amplifier 209. The multiplexer 208 converts the electric signals output in parallel from the amplifiers 207 into a serial image signal. The buffer amplifier 209 performs an impedance conversion on the image signal and outputs the resultant image signal. The image signal Vout output in the form of an analog electric signal from the buffer amplifier 209 is converted by an analog-to-digital converter 210 into digital image data and supplied to the signal processing unit 105 shown in FIG. 1. The image data is processed by the signal processing unit 105 shown in FIG. 1 and the resultant image data is supplied to the control computer 108.

In accordance with control signals (D-CLK, OE, and DIO) given by the control unit 106 shown in FIG. 1, the driving circuit 102 outputs, to the respective driving lines, driving signals having either an on-voltage Vcom that causes the switch element to turn on or an off-voltage Vss that causes the switch element to turn off thereby to control the turning-on/off of the switch elements and thus drive the detection unit 101. The power supply unit 107 shown in FIG. 1 includes the bias power supply 107a and the amplifier reference power supply 107b shown in FIG. 2. The bias power supply 107a supplies the voltage Vs in common to the other electrode of each conversion element via the bias supply line Bs. The reference power supply 107b supplies the reference voltage Vref to the non-inverting input terminal of each operational amplifier.

In FIG. 1, if the control unit 106 receives a control signal from the control computer 108 or the like disposed outside the apparatus via the signal processing unit 105, the control unit 106 supplies control signals to the driving circuit 102, the power supply unit 107, and the reading circuit 103 thereby to control the operation detector 104. More specifically, the control unit 106 controls the operation of the driving circuit 102 by giving the control signal D-CLK, the control signal OE, and the control signal DIO to the driving circuit 102, where the control signal D-CLK is a shift clock of a shift register used as a driving circuit, the control signal DIO is a pulse transferred by the shift register, and the control signal OE is a signal for controlling the output terminal of the shift register. On the other hand, the control unit 106 controls various parts in the reading circuit 103 by supplying a control signal RC, a control signal SH, and a control signal CLK to the reading circuit 103 where the control signal RC controls the operation of the reset switch of the integrating amplifier, the control signal SH controls the operation of the sample-and-hold circuit 205, and the control signal CLK controls the operation of the multiplexer 208.

Figure 5A:
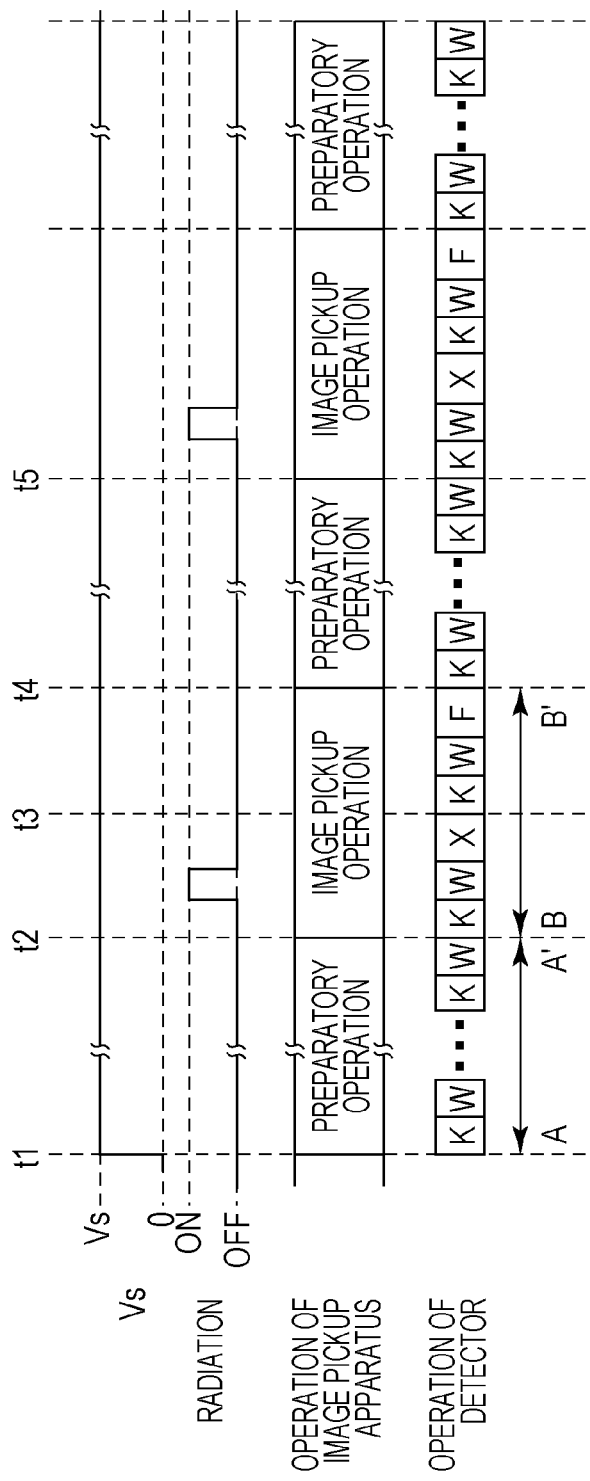

Next, referring to FIGS. 5A to 5C, the operation of the image pickup apparatus according to the present embodiment is described in further detail below. FIG. 5A illustrates driving timing in a general operation of the image pickup apparatus, FIG. 5B illustrates details of timing in an interval from A to A' in FIG. 5A, and FIG. 5C illustrates details of timing in an interval from B to B' in FIG. 5A.

In FIG. 5A and FIG. 5B, if the voltage Vs is supplied to the conversion element 201 at time t1, the image pickup apparatus 100 performs the preparatory operation for image pickup operation in an image pickup preparation period. The preparatory operation for image pickup operation refers to an operation of performing initialization process K at least once to stabilize a change in characteristic of the detector 104 that occur when the application of the voltage Vs is started. In the present embodiment, the initialization process K is performed repeatedly k times. The initialization process K is a process of applying an initial bias voltage to the conversion element before the accumulation operation to thereby initialize the conversion element. In the flow chart shown in FIG. 5A, the preparatory operation for image pickup operation includes a plurality of sets each including the initialization K and the accumulation operation W, and the set of these operations is performed a plurality of times. When the change in characteristic of the detector 104 converges at time t3, the image pickup apparatus 100 starts the image pickup operation. In a period from time t2 to time t3 included in a period from time t2 to time t4, the image pickup apparatus 100 performs initialization K, the accumulation operation W, and an image output operation X. The accumulation operation W in the image pickup operation is an operation performed by the conversion element to generate an electric charge over a period corresponding to irradiation of radiation. The image output operation X is an operation of outputting image data based on an electric signal corresponding to the electric charge generated in the accumulation operation W. In the present embodiment, the accumulation operation W in the image pickup operation is performed during the period with the same length as the accumulation operation W in the preparatory operation for image pickup operation. However, the present invention does not have a particular restriction on the length of the accumulation operation W. To reduce the period of the preparatory operation for image pickup operation, the period of the accumulation operation W in the preparatory operation for image pickup operation may be set to be shorter than the accumulation operation W in the image pickup operation. In the present embodiment, to generate an electric charge by the conversion element in a dark state without irradiating radiation, a dark image output operation F is performed. In the dark image output operation F, an accumulation operation W is performed for a period with the same length as the accumulation operation W performed before the image output operation X, and dark image data is output based on the electric charge generated in the accumulation operation W. In the dark image output operation F, an operation similar to the image output operation X is performed by the image pickup apparatus 100. If the image pickup operation is complete at time t4, the image pickup apparatus 100 starts another preparatory operation for image pickup operation and continues it until time t5 at which the next image pickup operation is to be started.

Next, referring to FIG. 5B, the preparatory operation for image pickup operation is described in further detail below. In the initialization K, as shown in FIG. 5B, the control unit 106 first supplies the control signal RC to the reset switch to reset the integrating capacitor of the integrating amplifier 203 and the signal line. Next, in the state in which the voltage Vs is applied to the conversion element 201, the driving circuit 102 supplies the on-voltage Vcom to the driving line G1 to turn on the switch elements T11 to T13 of pixels in the first row. As a result of the turning-on of the switch elements, the conversion elements are initialized. In the initialization process, electric charges of conversion elements are output via the switch elements. However, in the present embodiment, the control signal SH and the control signal CLK are not output and thus the sample-and-hold circuit and circuit elements following it does not operate. Therefore, the reading circuit 103 does not output data corresponding to the above electric signal. Thereafter the integrating capacitor and the signal line are reset again thereby to process the output electric signal. However, in a case where a correction or the like is performed using the data corresponding to the electric signal, the control signal SH and the control signal CLK may be output to operate the sample-and-hold circuit and circuit elements following it as in the image output operation or the dark image output operation. By performing the above-described operation including the turning-on of the switch elements and resetting repeatedly for the respective rows from the first to the m-th row, the detector 101 is initialized. In the initialization, the reset switch may be kept in the on-state also at least during the period in which the switch elements are in the on-state thereby to continue the resetting. The on-period of the switch element in the initialization may be shorter than the on-period of the switch element in the image output operation. In the initialization, the turning-on of the switch elements may be performed simultaneously for a plurality of rows. In either case, it becomes possible to reduce the total time of the initialization thereby allowing the change in characteristic of the detector to converge in a shorter time. Note that in the present embodiment, the initialization K is performed, after the preparatory operation for image pickup operation, in the same period in which the image output operation in the image pickup operation is performed. In the accumulation operation W, in the state in which the voltage Vs is applied to the conversion element 201, the off-voltage Vss is applied to the switch element 202 such that the switch element is in the off-state for all pixels.

Next, referring to FIG. 5C, the image pickup operation is described in further detail below. A further description of similar parts in the operation to those described above is omitted. In the image output operation, as shown in FIG. 5C, the control unit 106 first outputs the control signal RC to reset the integrating capacitor and the signal line. The on-voltage Vcom is then supplied to the driving line G1 from the driving circuit 102 to turn on the switch elements T11 to T1$n$ in the first row. As a result, electric signals based on electric charges generated by conversion elements S11 to S1$n$ in the first row are output to the respective corresponding signal lines. The electric signals output in parallel via the signal lines are amplified by the integrating amplifiers 203 and the variable gain amplifier 204 of the respective amplifiers 207. The amplified electric signals are held in parallel by the sample-and-hold circuits 205 that operate in response to the control signal SH. After the electric signals are held, the control signal RC is output from the control unit 106 to reset the integrating capacitor of the integrating amplifier 203 and the signal line. After the resetting, the on-voltage Vcom is applied to the driving line G2 in the second row as in the first row thereby to turn on the switch elements T21 to T2$n$ in the second row. In the period in which the switch elements T21 to T2$n$ in the second row are in the on-state, the multiplexer 208 sequentially outputs the electric signals held by the sample-and-hold circuits 205. Thus, the electric signals read in parallel from the pixels in the first row are converted into a serial image signal, and the serial image signal is converted by the analog-to-digital converter 210 into one row of image data and output. The operation described above is performed for each row from the first row to the m-th row whereby one frame of image data is output from the image pickup apparatus. On the other hand, in the dark image output operation F, the image pickup apparatus 100 performs an operation in a similar manner to the image output operation X except that the operation is performed in a dark state in which no radiation is irradiated.

Second Embodiment

Figure 6A:
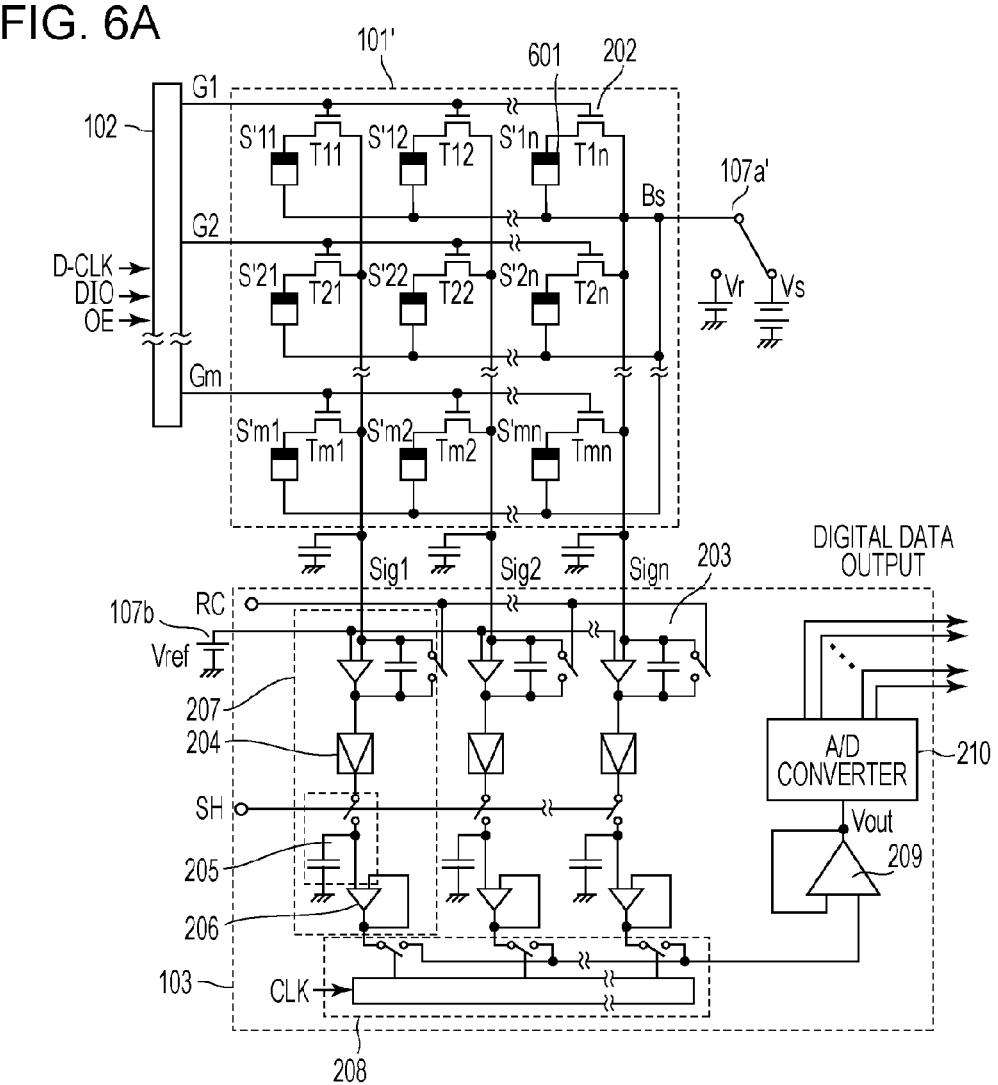
FIGS. 6A and 6B are equivalent circuit diagrams of an image pickup apparatus according to a second embodiment of the present invention.
Figure 6B:
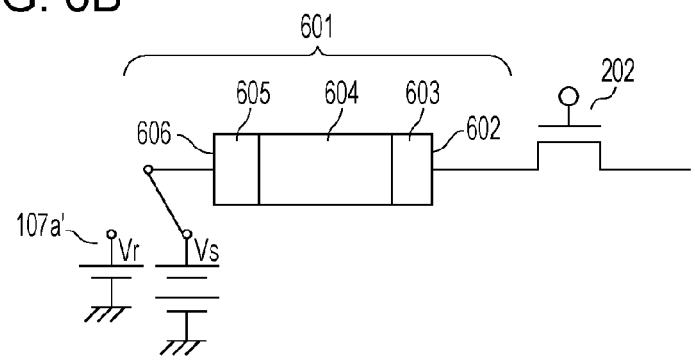

Next, referring to FIGS. 6A and 6B, an image pickup apparatus according to a second embodiment of the present invention is described below. In FIGS. 6A and 6B, similar elements to those shown in FIG. 3 are denoted by similar reference symbols or numerals, and a further detailed description thereof is omitted. Although the example shown in FIG. 6A, for simplicity of illustration, the detector of the image pickup apparatus includes pixels arranged in an array with 3 rows and 3 columns as in FIG. 3, practical image pickup apparatuses include a greater number of pixels. FIG. 6B illustrates a simplified equivalent circuit of one pixel.

In the first embodiment described above, each conversion element 201 of the detection unit 101 is realized using a PIN-type photodiode. In contrast, in this second embodiment, each conversion element 601 of a detection unit 101' is of a MIS-type conversion element realized using a MIS-type photoelectric conversion element. Furthermore, unlike the first embodiment in which the other electrode of each conversion element 201 is electrically connected to the bias power supply 107$a$ via the common bias supply line Bs, the other electrode of each conversion element 601 in the present embodiment is electrically connected to a bias power supply 107$a'$ via the common bias supply line Bs. This bias power supply 107$a'$ is configured to also supply a voltage Vr to the other electrode of each conversion element 601 to refresh the conversion elements 601 as well as a voltage Vs.

Furthermore, as shown in FIG. 6B, each conversion element 601 is configured such that a semiconductor layer 604 is disposed between a first electrode 602 and a second electrode 606, and an insulating layer 603 is disposed between the first electrode 602 and the semiconductor layer 604. Furthermore, an impurity semiconductor layer 605 is disposed between the semiconductor layer 604 and the second electrode 606. The second electrode 606 is electrically connected to the bias power supply 107$a'$ via the bias supply line Bs. As with the conversion element 201, the conversion element 601 is supplied with voltages such that the voltage Vs is supplied to the second electrode 606 from the bias power supply 107$a'$ and the reference voltage Vref is supplied to the first electrode 602 via the switch element 602 whereby the accumulation operation is performed. In the refreshing process, the refreshing voltage Vr is supplied to the second electrode 606 from the bias power supply 107$a'$ such that the conversion element 601 is refreshed by the bias voltage |Vr−Vref|. The refreshing process is performed to eliminate, by moving toward the second electrode 606, electrons or holes of electron-hole pairs that are generated in the semiconductor layer 604 of the MIS-type conversion element and accumulated between the semiconductor layer 604 and the insulating layer 603 without being capable of passing through the impurity semiconductor layer 605. The refreshing process will be described in further detail later.

Next, referring to FIGS. 7A and 7B, time-dependent amount of afterimage of the conversion element according to the second embodiment of the present invention is described below. Note that the conversion element has time-dependent noise similar to that described above with reference to FIGS. 4A and 4B, and thus a further detailed description thereof is omitted.

Figure 7A:
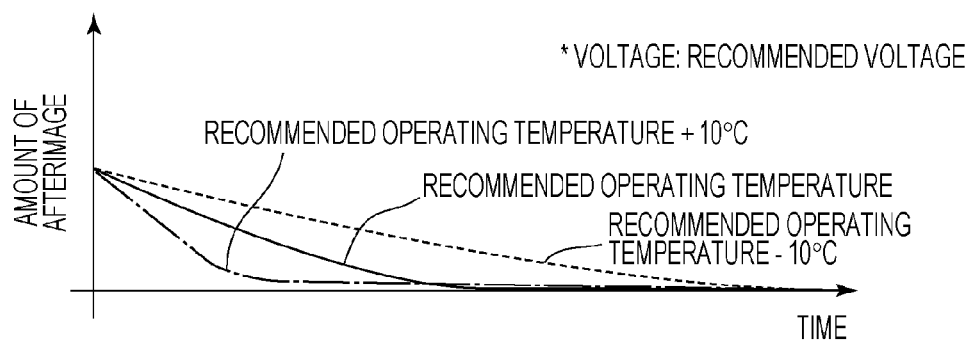
FIGS. 7A and 7B are characteristic diagrams illustrating time dependence of afterimage of a conversion element according to the second embodiment of the present invention.
Figure 7B:
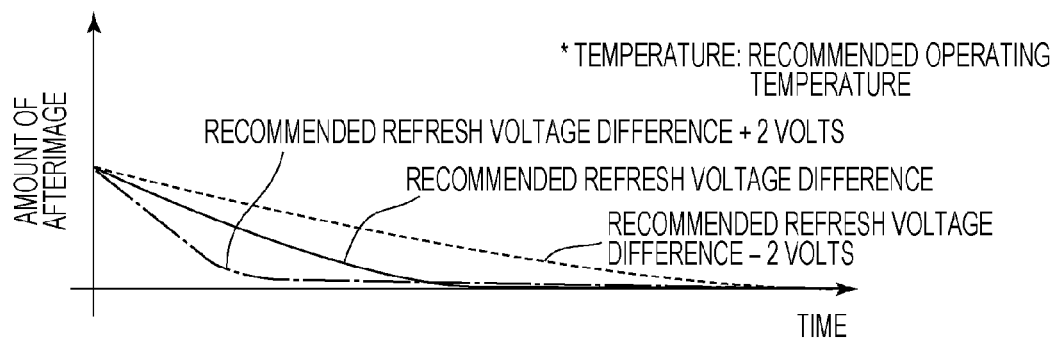

As shown in FIGS. 7A and 7B, an afterimage appears immediately after the voltage is applied to the conversion element. The amount thereof is the greatest immediately after the voltage is applied to the conversion element and decreases with elapsed time until it converges to a particular value. This occurs because of following factors specific to the MIS-type conversion element, in addition to similar factors to those described above in the first embodiment. In the MIS-type conversion element, either electrons or holes of the electron-hole pairs generated by a dark current or the like are accumulated between the semiconductor layer 604 and the insulating layer 603. This can cause the potential Va at the interface between the semiconductor layer 604 and the insulating layer 603 to change with time after the voltage is applied to the conversion element. The change in the potential Va causes the voltage applied to the semiconductor layer 604 to change, and thus, in the MIS-type conversion element, the sensitivity changes with time after the voltage is supplied to the conversion element. Hereinafter, this phenomenon will be referred to as the change in sensitivity. If the image pickup operation is performed in a state in which the sensitivity is changing, then, in the MIS-type conversion elements of the pixels exposed to radiation or light, either electrons or holes of the electron-hole pairs generated by the radiation or light are accumulated between the semiconductor layer 604 and the insulating layer 603, which results in a large change in potential Va. On the other hand, in MIS-type conversion elements of pixels that are not exposed to radiation or light, the potential Va does not have a change caused by electron-hole pairs generated by radiation or light. As a result, the MIS-type conversion elements have a difference in sensitivity between the pixels that are exposed to radiation or light and those that are not exposed. This difference in sensitivity causes an afterimage to appear in image data obtained by a next image pickup operation. The afterimage can be significantly large in particular when the refreshing does not eliminate sufficiently either electrons or holes of electron-hole pairs accumulated between the semiconductor layer 604 and the insulating layer 603.

On the other hand, after a sufficiently long time has elapsed, if a sufficiently great number of either electrons or holes of electron-hole pairs generated by the dark current or the like have been accumulated between the semiconductor layer 604 and the insulating layer 603, then the potential Va converges to a desired potential depending on an elapsed time since the supplying of the voltage to the conversion element is started. This phenomenon is prominent in particular when the refreshing does not eliminate sufficiently either electrons or holes of electron-hole pairs accumulated between the semiconductor layer 604 and the insulating layer 603. The convergence of the potential Va leads to a reduction in sensitivity difference in the image pickup operation, and the change in sensitivity also converges. Thus, the sensitivity of the conversion element settles to a stable value. This state is referred to as a stable state. In the stable state, the change in potential Va caused by irradiation of light or radiation is also suppressed by the refreshing process. That is, the change in sensitivity of the conversion element caused by irradiation of light or radiation is suppressed, and the amount of afterimage caused the change in sensitivity is reduced. Thus, as shown in FIGS. 7A and 7B, an afterimage appears immediately after the voltage is applied to the conversion element, and the magnitude thereof is the greatest immediately after the voltage is applied to the conversion element and decreases with elapsed time toward a particular convergence value in the stable state.

The investigation performed by the present inventors has also revealed the following points. As shown in FIG. 7A, the amount of afterimage caused by the change in sensitivity decreases with increasing temperature of the conversion element, and the time needed for the change to converge to the particular value decreases with increasing temperature of the conversion element. This is because noise such as a dark current increases with increasing temperature, which increases the number of electron-hole pairs generated thereby. As a result, the number of electrons or holes of electron-hole pairs accumulated between the semiconductor layer 604 and the insulating layer 603 increases, and the potential Va converges to a desired potential in a shorter time. The investigation performed by the present inventors has also revealed that as shown in FIG. 7B, as the change in voltage applied to the conversion element in the refresh operation, i.e., |Vs−Vr|, increases, the amount of afterimage caused by the change in sensitivity decreases and the time needed for the amount of afterimage to converge to a particular value decreases. This is because as the change in voltage applied to the conversion element in the refresh operation increases, the number of either electrons or holes of electron-hole pairs that are eliminated by the refresh operation increases, and thus the potential Va converges to a desired value depending on the smaller number of electrons or holes of electron-hole pairs.

Figure 8A:
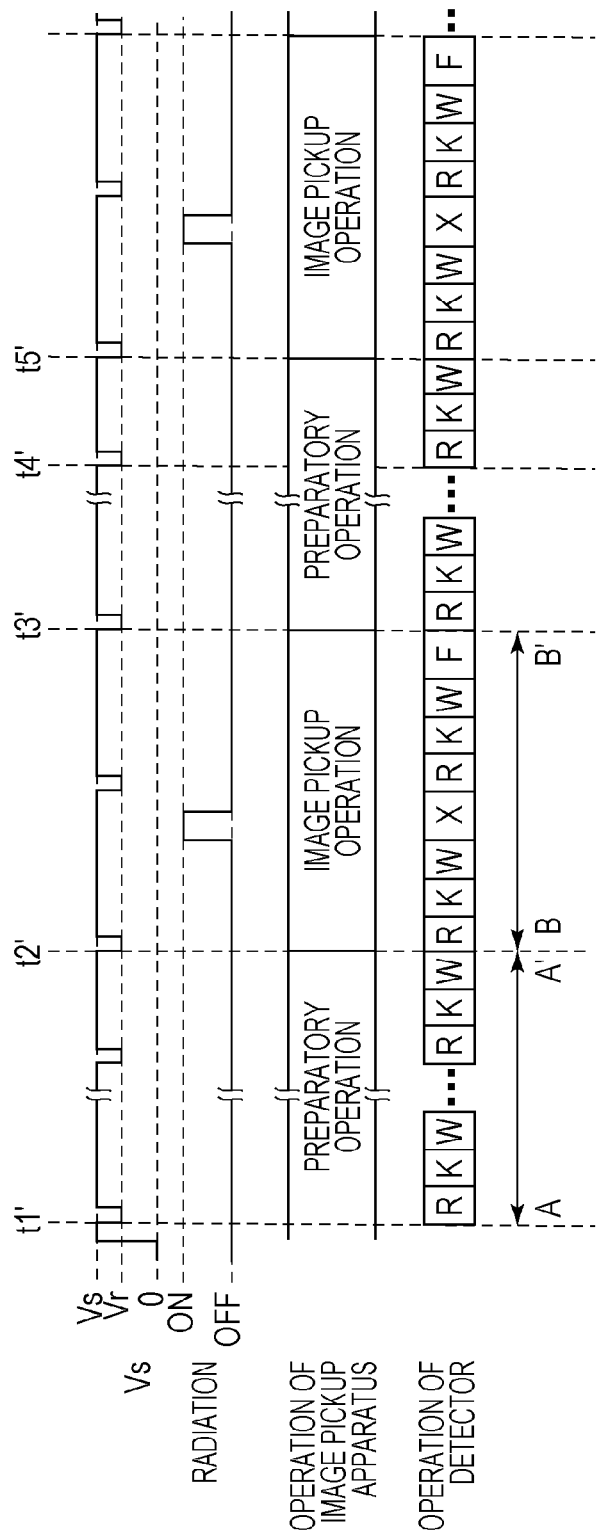
FIGS. 8A to 8C are timing charts associated with the image pickup apparatus according to the second embodiment of the present invention.
Figure 8B:
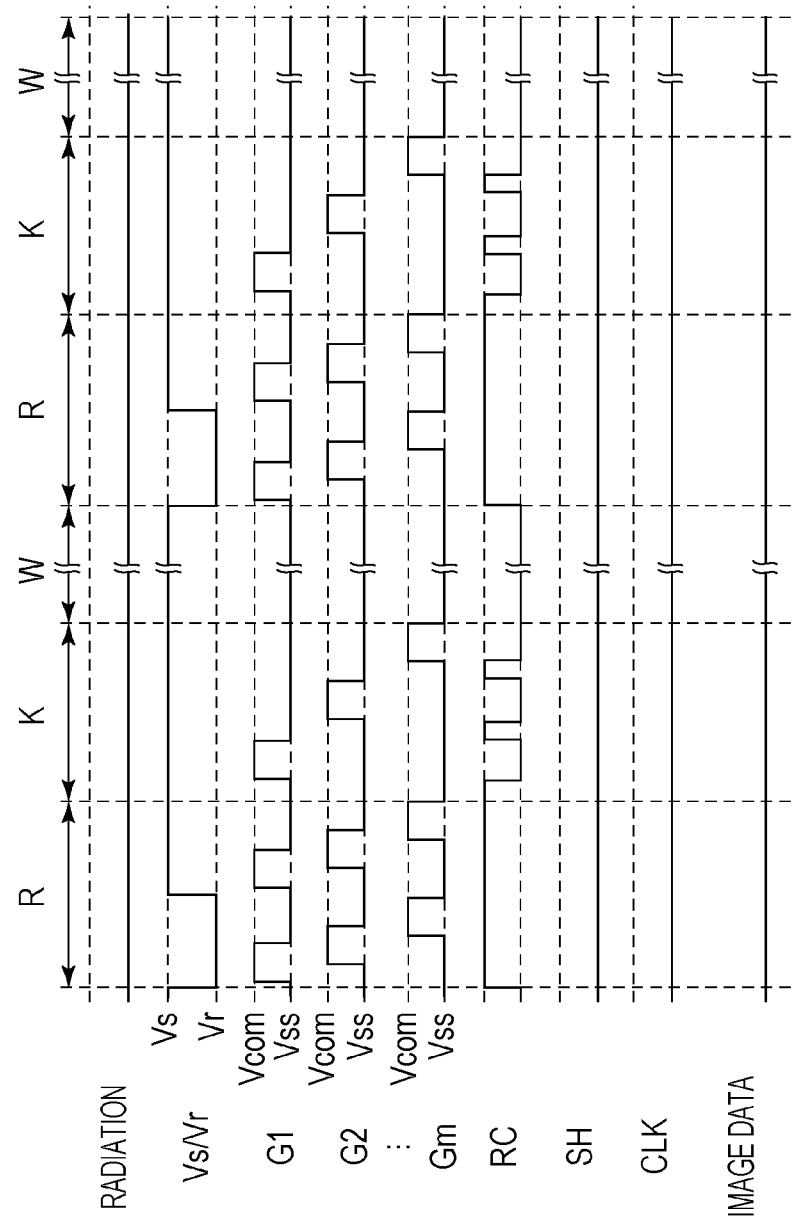
Figure 8C:
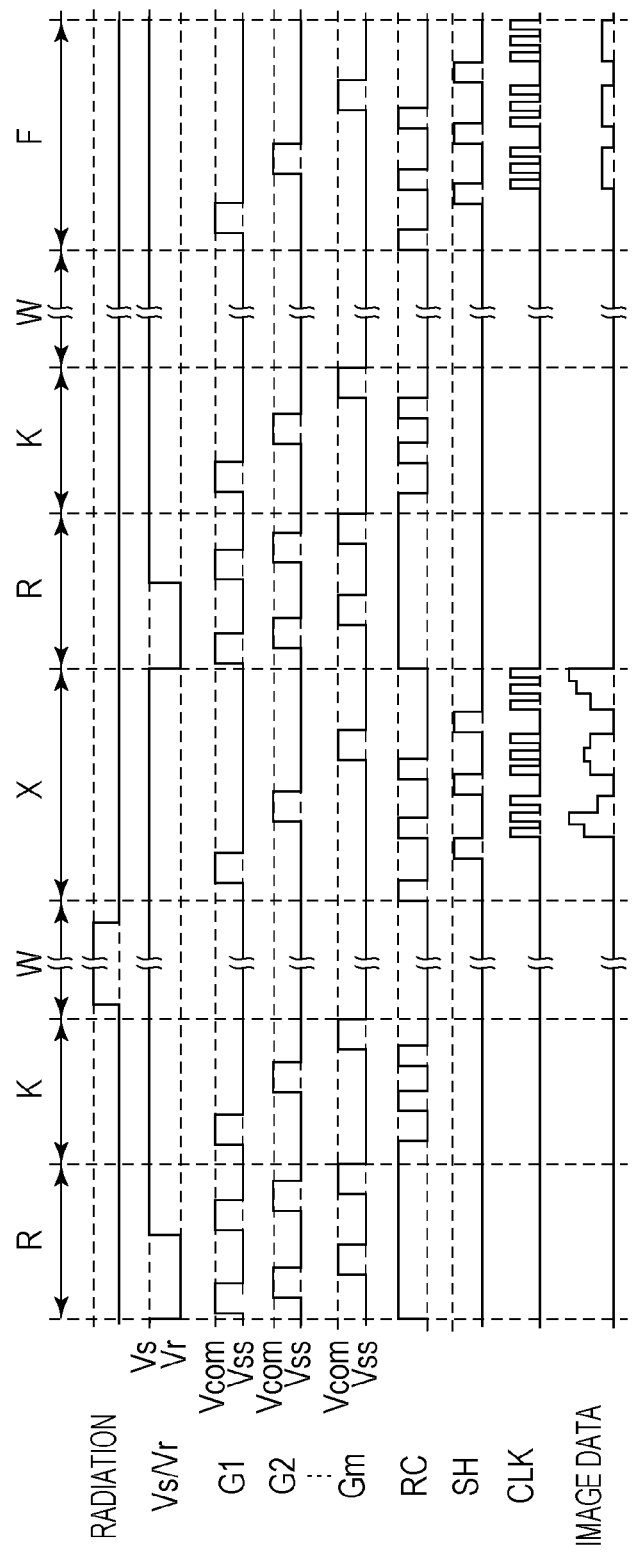

Next, referring to FIGS. 8A to 8C, the operation of the image pickup apparatus according to the present embodiment is described below. FIG. 8A illustrates driving timing in a general operation of the image pickup apparatus. FIG. 8B illustrates details of timing in an interval from A to A' in FIG. 8A, and FIG. 8C illustrates details of timing in an interval from B to B' in FIG. 8A. In FIGS. 8A to 8C, similar elements to those shown in FIGS. 5A to 5C are denoted by similar reference symbols or numerals, and a further detailed description thereof is omitted.

In the first embodiment described above, the preparatory operation for image pickup operation is performed such that a set of operations including the initialization K and the accumulation operation W is performed repeatedly a plurality of times. In contrast, in the present embodiment, the preparatory operation for image pickup operation is performed such that a set of operations includes the refresh operation R, the initialization K and the accumulation operation W, and the set of operations is performed repeatedly a plurality of times. The refreshing process is performed to eliminate, by moving toward the second electrode 606, electrons or holes of electron-hole pairs that are generated in the semiconductor layer 604 of the MIS-type conversion element and accumulated between the semiconductor layer 604 and the insulating layer 603 without being capable of passing through the impurity semiconductor layer 605. In the first embodiment described above, the image pickup operation is performed by performing a sequence of the initialization K, the accumulation operation W, the image output operation X, the initialization K, the accumulation operation W, and the dark image output operation F. In contrast, in the image pickup operation according to the present embodiment, the refresh operation R is performed before each initialization K. In the refresh operation, first, the refreshing voltage Vr is supplied to the second electrode 604 via the bias supply line Bs. Next, the respective switch elements are turned on to supply the reference voltage Vref to the first electrode 602 whereby the conversion element 601 is refreshed by the bias voltage |Vr−Vref|. A plurality of conversion elements 601 are sequentially refreshed on a row-by-row basis until all conversion elements 601 are refreshed and all switch elements are turned off. Thereafter, the voltage Vs is supplied to the second electrode 606 of the conversion element 601 via the bias supply line Bs and the reference voltage Vref is supplied to the first electrode 602 via the switch elements whereby the bias voltage |Vs−Vref| is supplied to the conversion element 601. When all switch elements are turned into the off-state, all conversion elements 601 are in a bias state that allows the image pickup operation to be performed, and the refresh operation is complete. Next, the initialization K is performed to initialize the conversion element 601 and stabilize the output characteristics. Thereafter, the accumulation operation W is performed.

Next, examples of processes that can be performed by the calculation unit 117 according to the present embodiment are described below. As in the first embodiment described above, the calculation unit 117 calculates the amount of noise and the amount of afterimage that can occur, using the prestored output characteristic information, the temperature of the detection unit 101', the voltage supplied to the detection unit 101', and the image pickup operation start time. In the present embodiment, using the output characteristic information, the temperature of the detection unit 101', the voltage Vr', and the required amount of noise and the required amount of afterimage specified by the control computer 108, the calculation unit 117 is capable of calculating the image pickup operation start time needed for the output characteristic of the image pickup operation to satisfy the specified required amount of noise and the required amount of afterimage. The investigation performed by the present inventors has also revealed that the time t0 needed for the change in the amount of afterimage to settle (hereinafter, referred to as the afterimage stabilizing period) can be expressed by an exponential function of the temperature T of the detector 101'. It has also been revealed that the afterimage stabilizing period t0 can be expressed by an exponential function of the voltage Vr. That is, the following condition holds:

$$t0 > \alpha \exp(\beta Vr' + \gamma T + \delta VrT) \quad \text{Equation (1)}$$

where $\alpha$, $\beta$, $\gamma$, and $\delta$ are coefficients that can be determined based on measurement performed for various values of parameters including the voltage Vr and the temperature T. One of effective methods of measuring $\alpha$, $\beta$, $\gamma$, and $\delta$ is to expose the detection unit 101' to radiation or light and determine afterimage stabilizing period t0 for various values of the elapsed time since the start of supplying the voltage to the conversion element. Another effective method is to continuously acquire image data in a state in which the detection unit 101' is not exposed to radiation or light, and estimate the afterimage stabilizing period t0 from the acquired image data. Using a similar method, it is possible to determine the relationship between the time t1 needed for the change in amount of noise to settle (hereinafter referred to as the) and the temperature T and/or the voltage Vr.

The investigation performed by the present inventors has also revealed that a time (required image pickup operation start time) ts needed for the change in amount of afterimage to decrease below a predetermined value that allows the output characteristic (required afterimage output characteristic) to satisfy a condition in terms of the amount of afterimage specified by the control computer 108 has a following relation with the afterimage stabilizing period t0.

$$ts > Gs/\{G(0) - G(t0)\}*t0 \quad \text{Equation (2)}$$

where Gs is the required afterimage output characteristic, G(0) is the amount of afterimage immediate after the voltage is applied to the conversion element, and G(t0) is the amount of afterimage when time t0 has elapsed since the application of the voltage.

It has also been revealed that the required image pickup operation start time ts needed to satisfy the output characteristic (required noise output characteristic) in terms of the amount of noise specified by the control computer 108 has a following relation with the noise stabilizing period t0.

$$ts > Ns/\{N(0) - N(t1)\}*t1 \quad \text{Equation (3)}$$

where Ns is the required noise output characteristic, N(0) is the amount of noise immediately after the voltage is applied to the conversion element, and N(t0) is the amount of noise when time t0 has elapsed since the application of the voltage.

From the above formulas, using the output characteristic information, the temperature of the detection unit 101', the required output characteristic, and the required image pickup operation start time, the calculation unit 117 can calculate the Vr' to be supplied to the detection unit 101' to satisfy the required output characteristic and the required image pickup operation start time. The control computer 108 may control the display apparatus such that the calculated required image pickup operation start time ts or the voltage Vr' to be supplied are displayed on the display apparatus 113.

Figure 9:
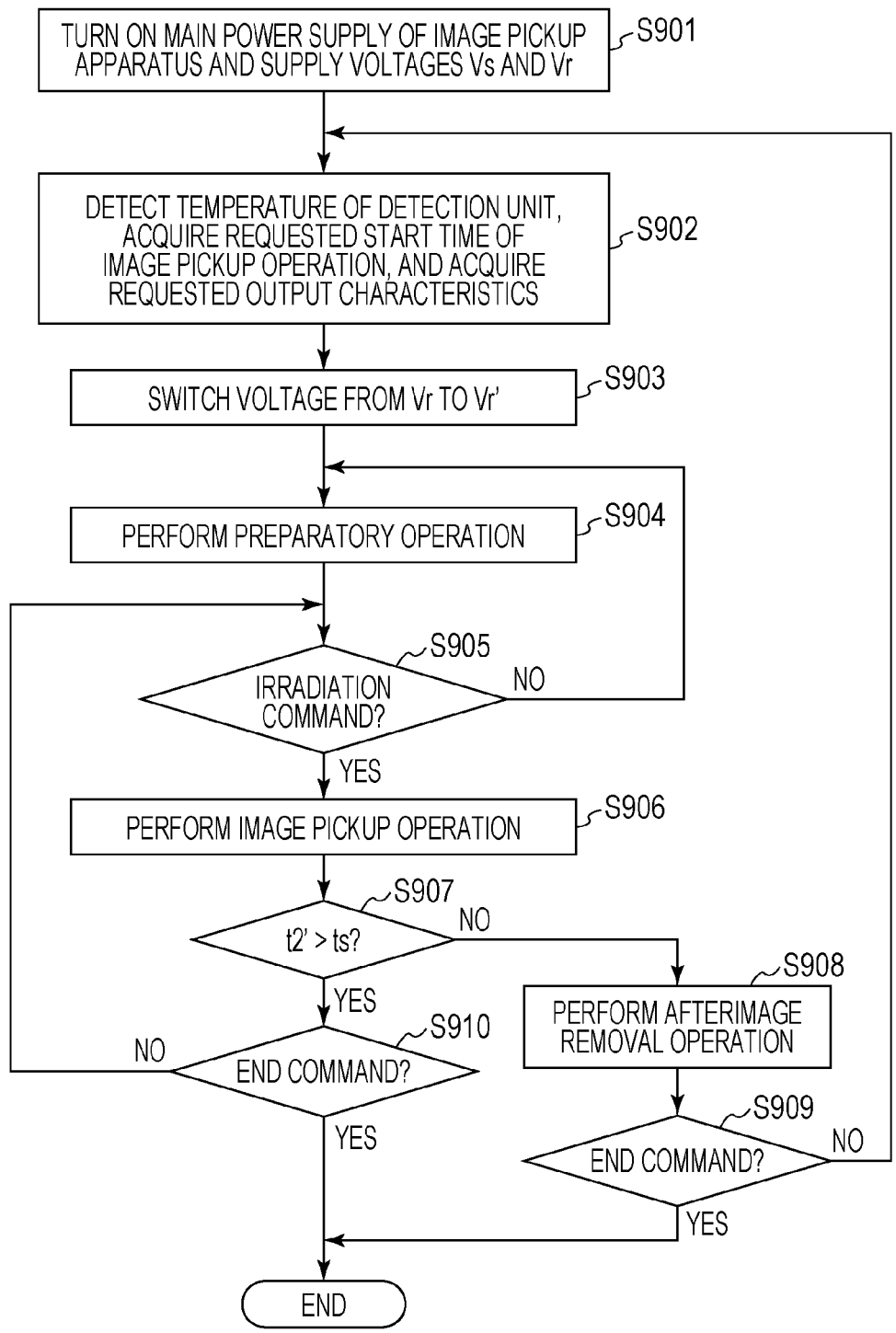
FIG. 9 is a flow chart illustrating an operation performed by an image pickup system according to the second embodiment of the present invention.

Next, referring to FIG. 9, a description is given below as to an operation flow to control the image pickup apparatus using the voltage value Vr calculated by the calculation unit 117. If a main power supply of the image pickup system is turned on in step S901, then, under the control of the control computer 108, the control unit 106 controls the power supply unit 107 to supply a voltage Vs to the detection unit 101. Next, in step S902, an operator inputs the required output characteristic and the required image pickup operation start time ts to the control computer 108 by operating the control console 114. The control unit 106 then controls the temperature detection unit 115 to detect the temperature of the detection unit 101. Information indicating the detected temperature and information indicating the required image pickup operation start time ts and the required output characteristic are transmitted to the calculation unit 117 from the temperature detection unit 115 and the control computer 108, respectively. Using the output characteristic information, the temperature of the detection unit 101', the required output characteristic, and the required image pickup operation start time ts, the calculation unit 117 calculates the voltage Vr' to be supplied to the detection unit 101' to satisfy the required output characteristic and the required image pickup operation start time ts. The calculation unit 117 transmits information indicating the calculated voltage value Vr' to the control computer 108, and the control computer 108 transmits a control signal to the control unit 106. In step S903, according to the control signal received from the control computer 108, the control unit 106 controls the power supply unit 107 to switch the voltage from Vr to Vr' and supply the voltage to the detection unit 101'. After the voltage Vr' is supplied, in step S904, the control unit 106 controls the detector 104 to perform the preparatory operation for image pickup operation.

In step S905, it is determined whether a radiation exposure command is issued. If the answer to step S905 is NO, the control unit 106 controls the detector 104 to further continue the preparatory operation for image pickup operation. However, if the answer to step S905 is YES, then the process proceeds to step S906. In step S906, the control unit 106 controls the detector 104 to perform the image pickup operation. After the image pickup operation is complete, in step S907, the image pickup operation start time t2' shown in FIG. 8A is compared with the required image pickup operation start time ts to determine whether the required output characteristic is satisfied. If it is determined in step S907 that the required output characteristic is not sissified (i.e., if the answer to step S907 is NO), this means that the amount of afterimage cannot be smaller than the desired value, and thus the process proceeds to step S908 in which the detector 104 performs an afterimage removal operation to eliminate the afterimage such that the afterimage does not influence the image data acquired in the image pickup operation performed later. The afterimage removal operation is performed by supplying an equal potential (for example, 0 volts) to both the first electrode 602 and the second electrode 606 of the conversion element for a predetermined period. After the afterimage removal operation, the process proceeds to step S909 to determine whether an END command is issued. If the answer to step S909 is YES, then the control unit 106 controls various units to end the sequence of the operation. If the END command is not issued (i.e., the answer to step S909 is NO), the process returns to step S902 to recalculate the voltage Vr' and switch the voltage. That is, in step S902, the detection of the temperature of the detection unit 101', the setting and the acquisition of the required image pickup operation start time, and the setting and the acquisition of the required output characteristic are performed by the computer 108 and the temperature detection unit 115. On the other hand, in a case where it is determined in step S907 that the required output characteristic is satisfied (i.e., if the answer to step S907 is YES), the process proceeds to step S910 without performing the afterimage removal operation. In step S910, if it is determined that the END command is issued (i.e., if the answer to step 910 is YES), then the control unit 106 controls various units to end the sequence of the operation. If the END command is not issued (i.e., if the answer to step S910 is NO), the control unit 106 controls the detector 104 to again perform the preparatory operation for image pickup operation.

As described above, the present embodiment makes it possible to predict the output characteristic of the image pickup operation for various values of the temperature of the detector 104 including MIS-type conversion elements and for various values of the image pickup operation start time. This makes it possible to change the operation of the image pickup apparatus or the value of the voltage supplied to the conversion elements based on the predicted output characteristic. Thus it is possible to control the image pickup operation start time such that the change in the image signal converges within the allowable range. Thus, it becomes possible to realize a small-size, small-weight, and low-power image pickup apparatus/system capable of suppressing the influence of the change in the image signal without having to use a light source.

The above-described embodiments of the present invention may also be implemented by executing a program by a computer in the control unit 106 or by the control computer 108. An implementation of any embodiment of the invention using a computer-readable storage medium such as a CD-ROM for supplying the program to the computer also falls within the scope of the present invention. Similarly, an implementation of any embodiment of the invention using a transmission medium such as the Internet to transmit the program also falls within the scope of the present invention. The program described above falls within the scope of the present invention. That is, the above-described program, the storage medium, the transmission medium, and the program product all fall within the scope of the present invention. Furthermore, any combination of the first and second embodiments described above falls within the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-065980 filed Mar. 24, 2011, which is hereby incorporated by reference herein in its entirety.

What is claimed is:

1. An image pickup apparatus comprising:
a detector including a detection unit including a plurality of conversion elements each configured to convert radiation or light into an electric charge, a driving circuit configured to drive the detection unit to output an electric signal corresponding to the electric charge from the detection unit, a reading circuit configured to output the electric signal as image data, whereby the detector performs an image pickup operation to output the electric signal;
a power supply unit configured to supply a voltage to the conversion elements;
a temperature detection unit configured to detect a temperature of the detection unit; and
a calculation unit configured to calculate an amount of noise and an amount of afterimage that is included in the electric signal or the image data in the image pickup operation, based on output characteristic information indicating a characteristic in terms of changes in amount of noise and amount of afterimage that is included in the electric signal or the image data as a function of elapsed time since the supplying of the voltage is started, the temperature, the voltage, and an image pickup operation start time indicating a time elapsed since the supplying of the voltage from the power supply unit to the detection unit is started until the image pickup operation is started.

2. The image pickup apparatus according to claim 1, further comprising:
a control unit configured to control the driving circuit, the reading circuit, and the power supply unit,
wherein the control unit controls the driving circuit, the reading circuit, and the power supply unit based on the amount of noise and the amount of afterimage calculated by the calculation unit such that at least either the voltage or an operation of the detector is changed.

3. The image pickup apparatus according to claim 1, wherein the conversion element includes a PIN-type photodiode or a MIS-type photoelectric conversion element.

4. An image pickup system comprising: the image pickup apparatus according to claim 2; and
a control computer that transmits a control signal to the control unit.

5. The image pickup system according to claim 4, wherein using the output characteristic information, the temperature, the voltage, and a required amount of noise and a required amount of afterimage specified by the control computer, the calculation unit calculates a required image pickup operation start time indicating an image pickup operation start time required for the amount of noise and the amount of afterimage that is included in the electric signal or the image data in the image pickup operation to satisfy the specified required amount of noise and the required amount of afterimage.

6. The image pickup system according to claim 5, wherein
the calculation unit calculates a voltage to be supplied to the conversion element wherein the voltage is required to satisfy the specified required amount of noise, the specified required amount of afterimage, and the required image pickup operation start time, based on the output characteristic information, the temperature, the required amount of noise and the required amount of afterimage specified by the control computer, and the required image pickup operation start time indicating the image pickup operation start time required for the amount of noise and the amount of afterimage that is included in the electric signal or the image data in the image pickup operation to satisfy the specified required amount of noise and the required amount of afterimage, and
the control unit controls the power supply unit such that the power supply unit supplies the determined voltage to the conversion element.

7. A method of controlling an image pickup apparatus including a detector including a detection unit including a plurality of pixels each including a conversion element configured to convert radiation or light into an electric charge, a driving circuit configured to drive the detection unit to output an electric signal corresponding to the electric charge from the detection unit, a reading circuit configured to output the electric signal as image data, whereby the detector performs an image pickup operation to output the electric signal, and a power supply unit configured to supply a voltage to the conversion elements, the method comprising:
detecting a temperature of the detection unit; and
calculating an amount of noise and an amount of afterimage that is included in the electric signal or the image data in the image pickup operation, using output characteristic information indicating a characteristic in terms of changes in amount of noise and amount of afterimage that is included in the electric signal or the image data as a function of elapsed time since the supplying of the voltage is started, the temperature, the voltage, and an image pickup operation start time indicating a time elapsed since the supplying of the voltage from the power supply unit to the detection unit is started until the image pickup operation is started.

8. The method of controlling an image pickup system including the method of controlling the image pickup apparatus according to claim 7, wherein the image pickup system includes the image pickup apparatus and the control computer that transmits a control signal to the control unit, and wherein the method further comprises calculating a required image pickup operation start time indicating an image pickup operation start time required for the amount of noise and the amount of afterimage that is included in the electric signal or the image data in the image pickup operation to satisfy the specified required amount of noise and the required amount of afterimage, based on the output characteristic information, the temperature, the voltage, and the required amount of noise and the required amount of afterimage specified by the control computer.

9. The method of controlling an image pickup system including the method of controlling the image pickup apparatus according to claim 7, wherein the image pickup system includes the image pickup apparatus and the control computer that transmits a control signal to the control unit, and wherein the method further comprises calculating a voltage to be supplied to the conversion element wherein the voltage is required to satisfy the specified required amount of noise, the specified required amount of afterimage, and the required image pickup operation start time, based on the output characteristic information, the temperature, the required amount of noise and the required amount of afterimage specified by the control computer, and the required image pickup operation start time indicating the image pickup operation start time required for the amount of noise and the amount of afterimage that is included in the electric signal or the image data in the image pickup operation to satisfy the specified required amount of noise and the required amount of afterimage, and supplying the determined voltage to the conversion element from the power supply unit.

10. An image pickup apparatus comprising:

a detector including a detection unit including a plurality of conversion elements each configured to convert radiation or light into an electric charge, a driving circuit configured to drive the detection unit to output an electric signal corresponding to the electric charge from the detection unit, and a reading circuit configured to output the electric signal as image data, whereby the detector performs an image pickup operation to output the electric signal;

a power supply unit configured to supply a voltage to the conversion elements;

a temperature detection unit configured to detect a temperature of the detection unit; and a control unit configured to control the driving circuit, the reading circuit, and the power supply unit, so that a required image pickup operation start time is controlled, wherein the required image pickup operation start time indicates an image pickup operation start time required for an amount of noise and an amount of afterimage that is included in the electrical signal or the image data in the image pickup operation, and wherein the amount of noise and amount of afterimage are calculated based on output characteristic information indicating a characteristic in terms of changes in the amount of noise and the amount of afterimage that is included in the electric signal or the image data as a function of elapsed time since supplying of the voltage is started, the temperature, the voltage, a required amount of noise and a required amount of afterimage, to satisfy the required amount of noise and the required amount of afterimage.

* * * * *